(No Model.)

A. GRAFF.
HOOK AND EYE.

No. 559,484. Patented May 5, 1896.

WITNESSES:
Murray H. Smith.
Wm R Gear.

INVENTOR
Andrew Graff
BY
Andrew Graff
ATTORNEY.

UNITED STATES PATENT OFFICE.

ANDREW GRAFF, OF BROOKLYN, NEW YORK.

HOOK AND EYE.

SPECIFICATION forming part of Letters Patent No. 559,484, dated May 5, 1896.

Application filed June 15, 1895. Serial No. 562,959. (No model.)

*To all whom it may concern:*

Be it known that I, ANDREW GRAFF, a citizen of the United States, and a resident of Brooklyn, county of Kings, State of New York, have invented new and useful Improvements in Hooks and Eyes, of which the following is a specification.

My invention relates to an improvement in hooks and eyes; and my invention is more particularly on the eye or loop used on all kinds of clothing for men, women, and children.

The object of my invention is to provide an eye that is hinged.

The further object of my invention is to provide an eye that can be hooked without injuring or tearing the fabric of which the garment is made.

My further object is to provide an eye that can be raised from the garment, so that it can be hooked or fastened much easier than with the old-style eye and with less trouble and exertion; also to provide an eye that can be raised or lowered at will, like a hinge, and after it has been caught by the hook will flatten down and straighten out, leaving no unevenness on the surface of the dress or garment; also to provide a hook and eye, the eye working like a hinge and the hook having a curve or depression on the lip or tongue, thereby preventing the hook from slipping out of the eye.

To the above ends my invention consists, essentially, in the details of construction and general arrangement of the several parts, as will hereinafter be fully described, as specifically designated in the claim.

Figure 1:
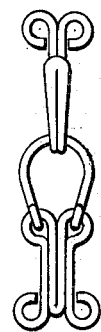
Figure 2:
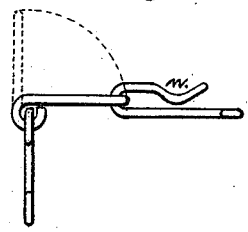
Figure 3:
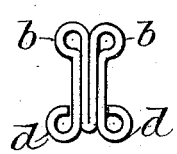
Figure 4:

In the accompanying drawings, Figure 1 represents the front or whole view of the eye with hook attached. Fig. 2 represents a side view of the eye with the loop raised and the hook attached, showing the curved or depressed lip or tongue. Fig. 3 represents the first section or ground plan, to which the eye or loop is fastened and also by which the eye is made fast to the garment. Fig. 4 represents the eye or loop into which the hook is caught when on the dress or garment.

In carrying out my invention a piece of wire of the desired thickness and quality (according to the size of the hook and eye required) is manipulated and formed into shape similar to Fig. 3, another piece of wire is cut to the required length and is also worked into form of Fig. 4, and still another piece of wire is cut and formed into shape of hook, Figs. 1 and 2. The two parts, Figs. 3 and 4, are now joined at the loops or hooks $a\ a$, Fig. 4, and $b\ b$, Fig. 3. The loops $a\ a$, Fig. 4, are now clenched or fastened securely, and the eye is now complete. The hook is depressed or curved at the lip or tongue in Fig. 2, and the hook and eye is now complete and ready for use. The three parts, Figs. 2, 3, and 4, can be made either by hand or machine, preferably by machine, as the work by hand is too expensive.

The loops $d\ d$, Fig. 3, are for the purpose of fastening the eye to the dress or garment, either by sewing, riveting, or any other suitable fastening, and a few stitches can be made across the shank of Fig. 3 between the loops $b\ b$ and $d\ d$.

Fig. 2 represents a side view of the hook and eye finished with the hook caught into the eye, the hook showing the depression or curve in the tongue or lip of hook, and also showing the position of the hook and eye when in actual use.

Having thus described my invention, what I claim as new and useful, and desire to secure by Letters Patent, is—

An eye for a hook-and-eye fastening for a dress or garment consisting of the combination of a U-shaped loop, having eyes formed at the ends of the U, with a base having two eyes at its forward end $b\ b$, Fig. 3, and two eyes at its rearward end $d\ d$, Fig. 3, the two eyes $d\ d$ at its rearward end being for the purpose of fastening said base to the dress or garment permanently, and the two eyes at the forward end of said base engaging or linking with the eyes at the end of the U-shaped loop for the purpose of allowing the U-shaped loop to be raised or lowered like a hinge, thereby preventing the hook from tearing the material of the garment, and after it has been hooked permitting flattening down and straightening out leaving no uneven surface on the dress or garment, substantially as and for the purpose specified.

In testimony that I claim the foregoing as my invention I have signed my name, in presence of two witnesses, this 3d day of April, 1896.

ANDREW GRAFF.

Witnesses:
JOHN KAISER,
JULIUS LEHRENKRAUSS, Jr.